June 8, 1948.  J. W. MacCLATCHIE  2,443,110
PUMP PISTON
Filed Nov. 20, 1945
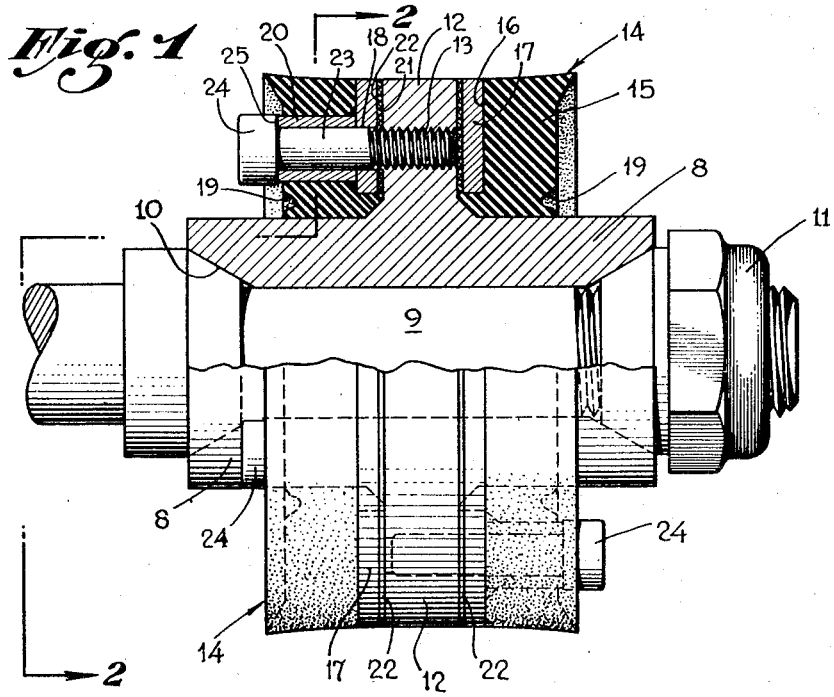
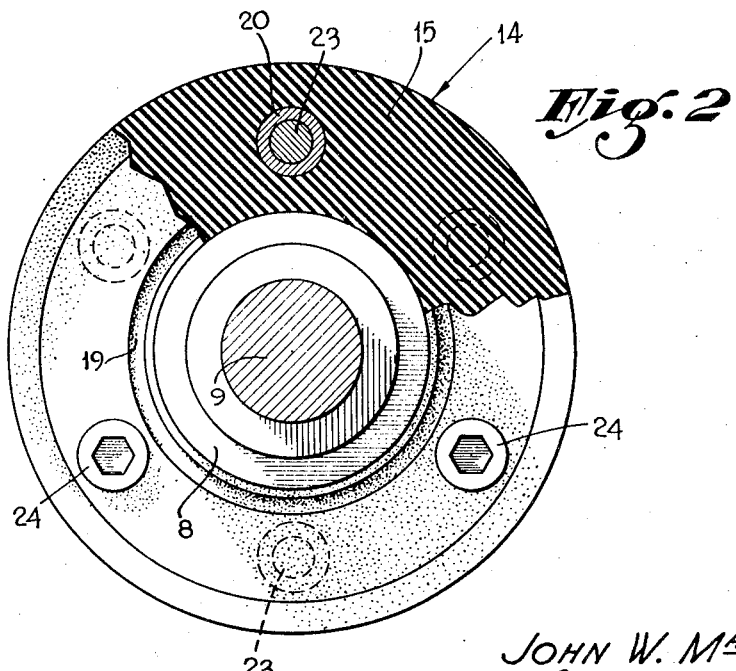
Inventor:
JOHN W. MacCLATCHIE,
By Robert M. McManigal
Attorney.

UNITED STATES PATENT OFFICE 2,443,110

PUMP PISTON

John W. MacClatchie, Los Angeles, Calif.

Application November 20, 1945, Serial No. 629,785

7 Claims. (Cl. 309—4)

This invention relates to pistons used in mud pumps and the like.

More particularly this invention relates to that type of piston in which annular packing elements of resilient material are mounted on an axial support with an abutment projecting radially from the axial support which forms a backing for the packing elements.

In conventional pistons the resilient portions of the packing elements are distorted as the packing elements are sealed off with respect to said abutment.

An object of my invention is to provide a means for sealing off said packing elements with respect to said abutment without distorting the resilient portions of said packing elements.

Another object of my invention is to provide a packing element which is provided with a longitudinally projecting reinforcing member by means of which the packing element is adapted to be sealed off with respect to the abutment without distorting the resilient portions of said packing elements.

Another object of my invention is to provide a pump piston in which all movement between the component parts of the piston is prevented.

Another object of my invention is to provide a packing element with tubular members by means of which the packing element may be sealed with respect to the radial flange of the piston without distorting the resilient portion of the packing element.

My invention has many other objects, advantages, and features, some of which, with the foregoing, will be set forth at length in the following description where I shall outline one form of my invention, which I have selected for illustration in the drawings accompanying and forming a part of the present sepcification.

In the drawings:

Figure 1 is a side elevational view of a piston embodying the invention, partly in section.

Figure 2 is a section taken along the line 2—2 of Figure 1.

The invention is illustrated embodied in a double acting piston, which comprises a hub 8 which is wedged on a piston rod 9 as indicated at 10 and secured on said rod by means of a retaining nut 11. A radial flange or abutment 12 projects integrally from the hub 8 intermediate the ends of the hub, which abutment is provided with a plurality of threaded bores 13.

Mounted on the hub 8 on each side of the flange 12 are packing elements 14, which are formed in part of rubber or other suitable resilient material 15, which parts of resilient material are referred to herein and in the claims as the resilient portions of the packing elements. The flange 12 forms a longitudinal backing for each of the packing elements 14. I prefer to reinforce the inner end 16 of each packing element 14 with a metallic plate 17 having bores 18.

The outer ends of the packing elements 14 may be provided with annular grooves 19, the sides of which grooves adjacent to the hub 8 are adapted to be expanded by fluid pressure to seal off the packing elements 14 with respect to said hub.

Means are provided to seal off the packing elements 14 with respect to the radial flange 12 without distorting the resilient portions 15 of the packing elements 4. As an instance of this arrangement, the packing elements 14 are provided with longitudinally projecting tubular members 20 which are secured to the metallic plates 17 around the openings 18 in said plates. Resilient material, fabric, or other suitable material 21, is also provided on the inner ends 22 of said metallic plates 17, which material may be vulcanized to the metallic plates 17 at the same time that the resilient material 15 is vulcanized to said plates and to said tubular members 20. The packing elements 14 are sealed off with respect to the flange 12 without distorting the resilient portions 15 of said packing elements, by means of screws 23 provided with heads 24 which are adapted to be threaded to the threaded bores 13 with the heads 24 contacting the outer ends 25 of tubular members 20 when the screws 23 have been screwed into position.

By means of my invention, all movement between the component parts of the piston is prevented. A better bond is provided between the metallic and resilient portions 15 of the packing elements, and the metallic plates 17 are reinforced. Furthermore, as stated above, the packing elements 14 are sealed off with respect to the flange 12 without distorting the resilient portions 15 of the packing elements 14. This is an important advantage in that if the rubber is distorted as the packing element is sealed off with respect to the flange, the periphery of the rubber is forced in contact with the walls of the pump cylinder, which results in excessive wear of the resilient material.

I have found that pistons embodying my invention have given excellent results, even when used in pumps operating at pressures up to 3,200 pounds per square inch.

From the foregoing description taken in connection with the accompanying drawings, the uses, advantages, and operation of my invention will be readily understood by those skilled in the art to which the invention appertains. While I have described the form of my invention which I now consider to be the best embodiment thereof, I desire to have it understood that the form shown is merely illustrative and that the invention is not to be limited to the details disclosed herein, but is to be accorded the full scope of the appended claims.

I claim:

1. In a pump piston, a hub, a radially projecting flange medial of the length of said hub and fixed against longitudinal movement relative thereto, annular packing elements mounted on the hub with the radially projecting flange forming a longitudinal backing for the packing elements, said packing elements having a longitudinally projecting reinforcing member, and annular grooves on the outer ends adjacent said hub, the sides of said grooves adjacent said hub being adapted to be expanded by fluid pressure to seal off said packing elements with respect to said hub, and means of tightening said reinforcing member with respect to said radially projecting flange.

2. In a pump piston, a hub, a radially projecting flange medial of the length of said hub and fixed against longitudinal movement relative thereto, annular packing elements mounted on the hub with the radially projecting flange forming a longitudinal backing for the packing elements, said packing elements having longitudinally projecting reinforcing members, and means adapted to abut said longitudinally projecting reinforcing members whereby said reinforcing members may be secured to said radially projecting flange.

3. In a pump piston, a hub, a radially projecting flange medial of the length of said hub and fixed against longitudinal movement relative thereto, annular packing elements mounted on the hub with the radially projecting flange forming a longitudinal backing for the packing elements, each of the inner ends of said packing elements being provided with a reinforcing plate, tubular members secured to said reinforcing plates, and means for sealing off said packing elements with respect to said radially projecting flange.

4. In a pump piston, a hub, a radially projecting flange medial of the length of said hub and fixed against longitudinal movement relative thereto, annular packing elements mounted on the hub with the radially projecting flange forming a longitudinal backing for the packing elements, each of the inner ends of said packing elements being provided with a reinforcing plate, tubular members secured to said reinforcing plates, the other sides of said reinforcing plates being provided with resilient material, and means for sealing off said packing elements with respect to said radially projecting flange without distorting the resilient portions of said annular packing elements.

5. In a pump piston, a hub, a radially projecting flange medial of the length of said hub and fixed against longitudinal movement relative thereto, annular packing elements mounted on the hub with the radially projecting flange forming a longitudinal backing for the packing elements, each of the inner ends of said packing elements being provided with a reinforcing plate, tubular members secured to said reinforcing plates, and means for securing said tubular members to said radially projecting flange without distorting the resilient portions of said annular packing elements.

6. In a pump piston, a hub, a radially projecting flange medial of the length of said hub and fixed against longitudinal movement relative thereto, annular packing elements mounted on the hub with the radially projecting flange forming a longitudinal backing for the packing elements, each of the inner ends of said packing elements being provided with a reinforcing plate, tubular members secured to said reinforcing plates, and means for exerting pressure against said tubular members in order to seal off said annular packing elements and said flange.

7. In a pump piston, a hub having a radially projecting flange intermediate the ends thereof, an annular packing element mounted on each end of said hub with said flange forming a backing for said packing elements, each of said packing elements being formed in part of resilient material and having a rigid reenforcing member extending entirely through the resilient material in a longitudinal direction, and means for clamping said packing elements against said flange by force exerted against the outer ends of said rigid reenforcing members and through said rigid reenforcing members to said flange whereby distortion of the resilient portions of said packing elements is avoided.

JOHN W. MacCLATCHIE.

REFERENCES CITED

The following references are of record in the file of this patent:

UNITED STATES PATENTS

| Number | Name | Date |
|---|---|---|
| 1,892,022 | Tyler | Dec. 27, 1932 |
| 2,051,262 | MacClatchie | Aug. 18, 1936 |
| 2,063,724 | Cater | Dec. 8, 1936 |
| 2,144,736 | MacClatchie | Jan. 24, 1939 |
| 2,233,030 | Penick | Feb. 25, 1941 |
| 2,320,973 | MacClatchie | June 1, 1943 |
| 2,320,975 | MacClatchie | June 1, 1943 |